United States Patent [19]

Matsumura et al.

[11] Patent Number: 5,242,648
[45] Date of Patent: Sep. 7, 1993

[54] METHOD FOR PREPARING BIAXIALLY STRETCHED POLYETHER ETHER KETONE FILM

[75] Inventors: Shuji Matsumura; Kazunari Okada; Yasuhiko Ohta; Masumi Saruwatari, all of Nagoya, Japan

[73] Assignee: Mitsui Toatsu Chemicals, Incorporated, Tokyo, Japan

[21] Appl. No.: 844,624

[22] PCT Filed: Aug. 21, 1990

[86] PCT No.: PCT/JP90/01058

§ 371 Date: Apr. 1, 1992

§ 102(e) Date: Apr. 1, 1992

[87] PCT Pub. No.: WO92/03495

PCT Pub. Date: Mar. 5, 1992

[51] Int. Cl.$^5$ ............................................. B29C 71/02
[52] U.S. Cl. ............................ 264/235.8; 264/342 RE
[58] Field of Search ............... 264/210.7, 235.8, 290.2, 264/342 RE

[56] References Cited

U.S. PATENT DOCUMENTS 5,095,078  3/1992  Mizuno et al. ............... 264/290.2 X

FOREIGN PATENT DOCUMENTS 58-63417   4/1983  Japan.
63-256422 10/1988  Japan.
1-101335   4/1989  Japan.
1-283127  11/1989  Japan.

Primary Examiner—Leo B. Tentoni
Attorney, Agent, or Firm—Burns, Doane, Swecker & Mathis

[57] ABSTRACT

A method for preparing a biaxially stretched polyether ether ketone (PEEK) film having excellent precision in thickness, insulating properties and heat shrinkage from an amorphous PEEK film which includes a first stretching step of roll-stretching the amorphous PEEK film in a temperature range of from 50° C. to (Tg−10)° C. in a stretching ratio of from 150% to 350% in the progress direction of the film while a necking phenomenon is caused in the film; a second stretching step of stretching the film in the temperature range of from Tg to 170° C. in a direction at right angles to the stretching direction in the first stretching step in a stretching ratio of from 150% to 350%; and a heat set step of thermally setting the stretched film at two stages in the temperature range of 210°–330° C. and the temperature range of 180°–210° C.

8 Claims, No Drawings

5,242,648

METHOD FOR PREPARING BIAXIALLY STRETCHED POLYETHER ETHER KETONE FILM

BACKGROUND OF THE INVENTION

1. Field of the Invention

The present invention relates to a method for preparing a biaxially stretched polyether ether ketone film. More specifically, it relates to a method for preparing a biaxially stretched polyether ether ketone film which inhibits the occurrence of breakages at the time of stretching, is excellent in thickness precision, and has a high dielectric breakdown voltage, no pinholes and a low shrinkage ratio by heating.

2. Description of the Related Art

A polyether ether ketone (hereinafter referred to as "PEEK") belongs to a crystalline thermoplastic resin series having the most excellent heat resistance, and it is an industrial material which is extremely excellent in chemical resistance, hot water resistance and slip properties in addition to heat resistance.

Heretofore, a polyethylene terephthalate and the like have been used as insulating materials for condensers and the like. In recent years, the demand for the condensers which can be used under specific circumstances, particularly at high temperatures has been increased. PEEK has been noted as an insulating materials for condensers which are used at high temperatures, because it can be biaxially stretched to form a thin film and is excellent in heat resistance. Additionally, PEEK is ready to be widely used as an insulating material in the fields of electrical industry, electronic industry and atomic industry.

Japanese Patent Laid-open No. 58-63417 discloses a method for preparing a biaxially oriented isotropic PEEK film in which the first axial stretching is carried out at 140°–180° C. in a stretching ratio of from 150% to 400%, and the second axial stretching is done at 150°–200° C. so that the difference between and the sum of the orientation coefficients of the first and the second stretching directions may be 0.1 or less and 0.7 or more, respectively, and heat setting is achieved, while controlled shrinkage of 20% or less is effected at a temperature of 200° C. or more and the melting point or less.

Japanese Patent Laid-open No. 01-101335 discloses a biaxially oriented PEEK film which can be obtained by dispersing spherical silica particles, carrying out the first stretching at an stretching temperature (Ti) of from [glass transition temperature (Tg)−10]° C. to (Tg+45)° C. in a stretching ratio of 150% or more and the second stretching at an stretching temperature (Ti+15)° C. to (Ti+40)° C., and then performing heat setting at 200°–350° C.

Furthermore, in Japanese Patent Laid-open No. 01-283127, a method for preparing a PEEK film is disclosed in which the first and the second axial stretchings are carried out at an stretching temperature of 130°–250° C. in a stretching ratio of from 200% to 500%, and then heat setting is conducted in a temperature range of from 250° C. to the melting point.

However, any preparation method disclosed in these publications uses high temperatures for the first stretching, and therefore crystallization takes place at the time of the first stretching, with the result that pinholes tend to occur in the film in the second stretching step, and the film breaks in a certain case. Such a film does not have a practical dielectric breakdown voltage and so it cannot be utilized as an insulating material.

Particularly, when roll stretching is carried out at the temperatures disclosed in the above-mentioned publications with the intention of obtaining a thin film having a thickness of 15 μm or less, the position where the film is released from stretching rolls falls off forward from a tangential direction between the two rolls, since the adhesive properties of the film to the orientation rolls are too strong. For this reason, it is difficult to accomplish the uniform stretching. As a result, the unevenness of the stretching increases, so that a film having good thickness precision cannot be obtained. This tendency is liable to occur when a gap between the stretchings (a space between stretching rolls) is small.

Moreover, the heat setting disclosed in the above-mentioned publications is not considered to be satisfactory to obtain a film having a low shrinkage ratio by heating.

OBJECTS AND SUMMARY OF THE INVENTION

An object of the present invention is to provide a method for preparing a biaxially stretched PEEK film which inhibits the occurrence of breakages at the time of stretching, is excellent in thickness precision, and has no pinholes and a high dielectric breakdown voltage. Furthermore, another object of the present invention is to provide a method for preparing a biaxially stretched PEEK film having a low shrinkage ratio by heating.

That is, the present invention is directed to a method for preparing a biaxially stretched polyether ether ketone film from an amorphous polyether ether ketone film which comprises a first stretching step of roll-stretching the amorphous polyether ether ketone film in a temperature range of from 50° C. to (the glass transition temperature of the film −10)° C. in a stretching ratio of from 150% to 350% in the progress direction of the film while a necking phenomenon is caused in the film, a second stretching step of stretching the film in the temperature range of from the glass transition temperature of the film to 170° C. in a direction at right angles to the stretching direction in the first stretching step in a stretching ratio of from 50% to 350%, and a heat set step of thermally setting the thus stretched film at two stages in the temperature range of 210°–330° C. and the temperature range of 180°–10° C.

DESCRIPTION OF THE PREFERRED EMBODIMENTS

As noted above, one feature of the present invention resides in that the first stretching of an amorphous PEEK film is performed at a low temperature of from 50° C. to (the glass transition temperature of the film −10)° C. while a necking phenomenon is caused in the film. Therefore, the present invention can provide a biaxially stretched PEEK film having neither breakages nor pinholes and having a high dielectric breakdown voltage and an excellent precision in thickness, even in the case of an extremely thin film having a thickness of 15 μm or less. Another feature of the present invention resides in that heat setting is carried out at two stages in the temperature ranges of 210°–330° C. and 180°–210° C., and thus it is possible to prepare the film having a low shrinkage ratio by heating.

The above-mentioned dielectric breakdown voltage in the present invention can be measured in a manner described in the undermentioned examples.

PEEK in the present invention is a polymeric compound having a repeating constitutional unit represented by the formula [I]:

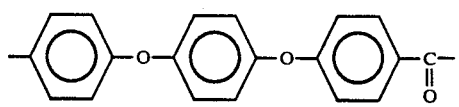

Particularly, PEEK in which a melting viscosity at 375° C. and a shear rate of 10 second$^{-1}$ is 100–10,000 Pa. second is preferably used. One example of PEEK is the trade name VICTREX PEEK 380G made by ICI in Britain.

For the purpose of adjusting the melting viscosity of PEEK, another resin such as a polyester or a polycarbonate may be blended with PEEK. The amount of the other resin should be in such a range as not to impair the characteristics of PEEK, and in general, it is preferably 5 parts by weight or less based on 100 parts by weight of PEEK. In addition, additives such as a stabilizer, an antioxidant and an ultraviolet light absorber may be suitably added to PEEK.

In the present invention, no particular restriction is put on a preparation method of PEEK, and therefore PEEK which is used in the present invention can be manufactured by a known methods.

In the present invention, the biaxially stretched PEEK film can be prepared by obtaining an amorphous film by a known melt extrusion process or the like, roll-stretching this film in one direction under specific conditions to form a uniaxially stretched film, tenter-stretching the same in a direction at right angles to the above direction to form a biaxially stretched film, and then thermally setting the thus stretched film under specific conditions.

No particular restriction is put on the thickness of the obtained biaxially stretched PEEK film, but the present invention is suitable for the preparation of a biaxially stretched PEEK film having a thickness of from 1 to 50 μm, particularly a thin film of 15 μm or less.

The amorphous PEEK film has a glass transition temperature (hereinafter referred to as "Tg") of about 144° C., a glass transition starting temperature of about 130° C. and a crystallization starting temperature of about 165° C., and it can be obtained by quenching, with cooling rolls having a surface temperature of about 100° C., a molten film extruded by a melt extrusion process at about 400° C. The thickness of the amorphous PEEK film depends upon the desired thickness of the biaxially stretched PEEK film, but it is usually about 10–300 μm.

No particular restriction is put on the type of roll stretching machine, and usual one is acceptable. For example, a roll stretching machine comprising plural preheating rolls, plural stretching rolls and cooling rolls can be used.

In order to obtain the uniaxially stretched film by the present invention, it is necessary to roll-stretch the amorphous PEEK film in a temperature range of 50° C. to (Tg−10)° C. in a stretching ratio of from 150% to 350%.

The preferable stretching ratio is from 170% to 300%. When the stretching ratio is less than 150%, molecules are not sufficiently oriented, so that the stretching effect is poor and the thickness of the obtained film is uneven. When the stretching ratio is more than 350%, stretching tension is too large and the film often breaks unpreferably at the time of the stretching.

In case that the stretching temperature is less than 50° C., the molecular motion of most amorphous chains is frozen and thus the change of a molecular morphology by the stretching scarcely occurs. In consequence, the amorphous chains are forcedly stretched, so that fine voids are formed in the film. The once formed voids do not vanish, and therefore stretching stress converges on the voids to cause pinholes, breakages and whitening of the film unpreferably.

The ether bond which PEEK has starts in molecular motion at 50° C. or more. This is the reason why the stretching is possible at a temperature of 50° C. or more. The first stretching of the present invention is effected by roll-stretching the amorphous PEEK film in the temperature range of from 50° C. to (Tg−10)° C. by the utilization of this molecular motion, while a necking phenomenon is caused in the film. Under the above-mentioned conditions, the occurrence of crystallization can be inhibited during the stretching. In the first stretching, the amorphous PEEK film is stretched in a machine direction (a progress direction) by giving tension to the amorphous PEEK film on the basis of a difference between peripheral speeds of a series of two or more stretching rolls. For the purpose of controlling the stretching temperature constantly, the preheating rolls are preferably disposed. The temperatures of the preheating rolls and the stretching rolls are set to the temperature range of from 50° C. to (Tg−10)° C., preferably from 80 to (Tg−10)° C., and the stretching is carried out by allowing the film to slide in the machine direction on the series of rolls, while the necking phenomenon is caused in the film.

As in the above-mentioned case, the temperature of the stretching rolls may be the same as that of the preheating rolls or may be set to a slightly lower temperature than that of the preheating rolls. No particular restriction is put on the gap between the preheating rolls and the stretching rolls, but in general, it is about 1–300 mm.

The selection of the stretching temperature range of from 50° C. to (Tg−10)° C. permits inhibiting the crystallization in the first stretching step.

When the stretching temperature is more than (Tg−10)° C., the crystallization proceeds due to heat given in the preheating and stretching steps. In the second stretching, the amorphous chain portions are oriented, but the crystallized portions become immobile points. As a result, the crystals function as nuclei to form pinholes, which cause the breakage of the film in the stretching step. In case that the pinholes are formed, the dielectric breakdown voltage of the film deteriorates. Such a film is impractical as insulating material. In addition, the crystallization leads to whitening unpreferably.

When the film is roll-stretched in the first stretching step while a necking phenomenon is caused in the film, the stretching similar to free-width uniaxial stretching can be achieved, whereby the film can be obtained in which the molecules are uniformly oriented in the stretching direction.

The degree of the necking phenomenon depends upon the stretching temperature, the stretching ratio, and the diameters and the gaps of the preheating rolls and the stretching rolls. In the case of an stretching temperature being 50° C. to (Tg−10)° C., a stretching ratio being from 150% to 350%, a diameter of the preheating rolls and the stetching rolls being 300 mm, and the gap therebetween being 1–300 mm, the degree of the necking phenomenon, i.e., the reduction ratio of a film width by the stretching is preferably from 5 to 50%. When the reduction ratio of the film width is less than 5%, the uniform orientation of the molecules cannot be obtained unpreferably. Conversely, when it is more than 50%, the wide film in compliance with the scale of facilities cannot be manufactured, which is not economical.

In the second stretching of the present invention, the stretching is carried out in the temperature range of from Tg to 170° C. in a direction at right angles to the stretching direction in the first stretching in a stretching ratio of from 150% to 350% by a tenter (a transverse stretching machine). The preferable stretching ratio is from 170% to 300%. When the stretching ratio is less than 150%, the molecules are not sufficiently oriented and thus the effect of the stretching is unpreferably poor. Conversely, when it is more than 350%, the film is often broken at the time of the stretching, and pinholes are also formed unpreferably.

The preferable temperature range is from Tg to 155° C. Since the second stretching is carried out by the tenter, there cannot be applied a procedure in which the film is stretched while the necking phenomenon is caused. Therefore, when the film is stretched at a temperature of Tg or less, the film tends to break at the time of the stretching. This is the reason why the stretching is required to be carried out at a temperature of Tg or more. Furthermore, when a temperature of 170° C. or more is employed, the crystallization makes progress in the film at the time of the preheating step in the tenter. As a result, the pinholes are formed at the time of the stretching and the film is liable to break unpreferably.

No particular restriction is put on the heating manner of the uniaxially stretched film, i.e., the heating manner for the secondary stretching by the tenter, but the usual heating manner utilizes hot air having a specific temperature. In the case of the heating with hot air, it is necessary that the film is preheated until the temperature of the central portion in the thickness direction of the film has become equal to the temperature of the hot air. The preheating time can be suitably decided by heat transfer calculation in view of the temperature of the hot air, the flow rate of the hot air, the stretching temperature, the thickness of the film, the heat transfer coefficient and the like, but it is usually from about 1 to 60 seconds.

The high-quality and extremely thin film having a thickness of 15 μm or less can be obtained only by the stretching method of the present invention, i.e., by roll-stretching, in the first stretching step, the film in the temperature range of from 50° C. to (the glass transition temperature of the film − 10)° C. in a stretching ratio of from 150% to 350% in the machine direction, while the necking phenomenon is caused in the film. Particularly, in the case of an extremely thin film having a thickness of 15 μm or less, when the stretching temperature in the first stretching step is less than 50° C., whitening and breakage of the film tend to occur, and conversely when it is in excess of (Tg − 10)° C., the releasing position of the film from the stretching rolls is scarcely fixed, with the result that the stretching ratio easily becomes uneven. As a result, any film having a good thickness precision cannot be obtained.

The stretching ratio is preferably from 150% to 350%, more preferably from 170% to 300%. When the stretching ratio is less than 150%, the thickness of the film is uneven. Conversely, when it is more than 350%, stretching tension excessively increases, so that the film breaks sometimes.

The biaxially stretched PEEK film which can be obtained by the method of the present invention is completely free from defects such as pinholes and the like, and therefore this film has an dielectric breakdown voltage of 350 V/μm or more and thus it is desirable as an insulating material.

The heat setting of the present invention is carried out in two stages. The heat setting in the first stage is performed in the temperature range of from 210°-330° C. (melting point), and the heat setting in the second stage is done in the temperature range of from 180°-210° C. which is lower than that in the first stage. In the above-mentioned temperature range for the heat setting in the second stage, the crystallization makes progress at the highest speed. The heat setting under the above-mentioned conditions permits obtaining a biaxially stretched PEEK film having the lowest shrinkage ratio by heating.

The reason why the biaxially stretched PEEK film having the low shrinkage ratio by heating can be obtained by the two-stage heat setting process is not definite but can be presumed as follows.

The heat setting in at the first stage is carried out in the temperature range of 210°-330° C. to produce relatively large crystals, and the heat setting in the second stage is done in the temperature range of from 180°-210° C. which is lower than that in the first stage, to produce relatively small crystals. These crystals having different sizes are distributed in the so-called closest packing state all over the film, whereby the biaxially stretched PEEK film having a high crystallinity can be obtained. For this reason, the biaxially stretched PEEK film having the low shrinkage ratio by heating can be obtained.

The heat setting time depends upon the heat setting temperature, but it is usually from 1 to 60 seconds. It is important for the enhancement of the dielectric breakdown voltage and the decrease of the heat shrinkage ratio to carry out the heat setting under such tension as to bring about a controlled shrinkage of from about 0.5 to 20% in the stretching direction in the second stretching step.

According to the present invention, there can be prepared the biaxially stretched PEEK film having neither breakages nor pinholes which tend to occur at the time of the stretching, and having the excellent thickness precision and the high dielectric breakdown voltage. In addition, there can also be prepared the biaxially stretched PEEK film having the low shrinkage ratio by heating.

The biaxially stretched PEEK film which can be manufactured by the present invention can be widely applied to industrial fields of electronics, electricity and the like, and particularly, the extremely thin film is very useful as a heat-resistant insulating material such as a substrate for a condenser or a flexible printed circuit (FPC) which is manufactured from a thin and heat-resistant insulating material.

Now, the present invention will be described in more detail in reference to examples.

EXAMPLES 1 TO 6, COMPARATIVE EXAMPLES 1 TO 4

PEEK (VICTREX PEEK 380G made by ICI) was melted and extruded at about 400° C. by the use of a single screw extruder having a cylinder diameter of 90 mm, and then quenched by cooling rolls at about 100° C. to produce amorphous PEEK films having a thickness of 100 μm. These amorphous PEEK films were stretched under the conditions (temperature and stretching ratio) shown in Table 1 by using a roll stretching machine comprising plural preheating rolls, stretching rolls and cooling rolls (all of which had a diameter of 300 mm), while a necking phenomenon is caused in the films. The reduction ratio of the film width by the necking phenomenon was from 5 to 20%.

Then, the films were stretched in a transverse direction at temperatures and in stretching ratios shown in Table 1 by means of a tenter stretching machine comprising a preheating zone, an stretching zone and a heat setting zone, each zone having a plurality of temperature controllers.

Furthermore, the films were treated under heat setting conditions shown in Table 1 to obtain biaxially oriented PEEK films having thicknesses shown in Table 2. In Examples 1 to 6, good films were obtained which were free from breakages, whitening and the like. In Comparative Example 1, the film was broken at the time of the first stretching (roll stretching) step, and so the test was stopped. In Comparative Example 3, the whitening of the film was noticeable in the first stretching step, and the film was broken in the second stretching step. In Comparative Example 4, the whitening of the film was noticeable and the unevenness of stretching was noticeable in both the first and second stretching steps. Table 1 sets forth average thicknesses of the raw films (amorphous PEEK films) and the variations of these thicknesses, average thicknesses of the biaxially stretched PEEK films and the variations of these thicknesses, and dielectric breakdown voltages.

In this case, each dielectric breakdown voltage (V/μm) was measured in the following manner.

100 specimens having a size of 5 cm×10 cm were prepared by cutting a film having a length of 20 m at random in a length direction and a width direction.

Both the surfaces of each specimen were brought into contact with mercury electrodes having an area of 20 cm², and voltage was then applied thereto. When the specimen was broken, the voltage at this point was measured. The voltage at the time of the breakage of the specimen was divided by an average value of thicknesses at 5 positions just close to the breakage, i.e., the hole in the specimen which brought about the insulation disruption, and the obtained quotient was referred to as the dielectric breakdown voltage. This measurement was repeated 100 times, and the average of the dielectric breakdown voltages was then obtained. In the 100 measurement operations, the number of the specimens in which the measured dielectric breakdown voltages were less than 300 V/μm was regarded as the number of defects, and they are set forth in Table 1.

Furthermore, the thickness of the film was measured in the following manner.

100 specimens were prepared in the same manner as in the measurement of the dielectric breakdown voltages. The thickness of each specimen was measured by the use of a thickness meter having a measurement precision of 1 μm. An average value of measured values of the 100 specimens and a variation were obtained.

EXAMPLES 7-11, COMPARATIVE EXAMPLES 5-7

The first and second stretching were carried out under the same conditions as in Example 1 to prepare biaxially stretched PEEK films. They were then treated under the heat setting conditions shown in Table 2, and heat shrinkage ratios of the thus treated biaxially stretched PEEK films were measured. The results are set forth in Table 2.

Each heat shrinkage ratio was measured in the following manner.

100 specimens having a size of 5 cm×5 cm were prepared in the same manner as in the measurement of the dielectric breakdown voltages. Each specimen was subjected to a heat treatment under conditions shown in Table 2 and the heat shrinkage ratio was then measured in accordance with the process described in JIS C2318. An average value of measured values of the 100 specimens and a variation were obtained.

TABLE 1

|  | Conditions of Stretching |  |  |  | Conditions of Heat Setting |  |
|---|---|---|---|---|---|---|
|  | Roll Stretching |  | Tenter Stretching |  | First Stage (20 sec.) | Second Stage (10 sec.) |
|  | Temp. (°C.) | Ratio (%) | Temp. (°C.) | Ratio (%) | Temperature (°C.) | |
| Example 1 | 130 | 250 | 150 | 2500 | 250 | 200 |
| Example 2 | 80 | 200 | 158 | 260 | 260 | 200 |
| Example 3 | 120 | 220 | 150 | 300 | 250 | 200 |
| Example 4 | 122 | 200 | 144 | 270 | 250 | 200 |
| Example 5 | 60 | 220 | 148 | 220 | 250 | 200 |
| Example 6 | 125 | 200 | 150 | 280 | 250 | 200 |
| Comp. Ex. 1 | 35 | 200 | — | — | — | — |
| Comp. Ex. 2 | 160 | 200 | 150 | 200 | 250 | 200 |
| Comp. Ex. 3 | 145 | 250 | 140 | 250 | 250 | 200 |
| Comp. Ex. 4 | 145 | 250 | 175 | 250 | 250 | 200 |

|  | Raw Film Thickness |  | Biaxially Stretched Film |  |  |  |
|---|---|---|---|---|---|---|
|  |  |  | Thickness |  | Dielectric Breakdown Voltage |  |
|  | Av. (μm) | Variation (%) | Av. (μm) | Variation (%) | Av. (V/μm) | Num. of Def. |
| Example 1 | 7.70 | 12.1 | 12.0 | 466 | 0 | |
| Example 2 | 32.3 | 9.85 | 8.2 | 11.2 | 49.2 | 0 |
| Example 3 | 32.4 | 10.83 | 7.4 | 11.2 | 430 | 0 |
| Example 4 | 22.1 | 15.07 | 6.0 | 16.7 | 467 | 0 |
| Example 5 | 23.2 | 11.90 | 6.3 | 18.9 | 462 | 0 |
| Example 6 | 19.0 | 15.79 | 4.2 | 18.0 | 387 | 0 |
| Comp. Ex. 1 | 51.4 | 7.70 | — | — | — | — |
| Comp. Ex. 2 | 25.8 | 10.70 | 5.9 | 22.9 | 266 | 67 |
| Comp. Ex. 3 | 51.4 | 7.70 | 13.5 | 30.3 | 111 | 91 |

TABLE 1-continued

| | | | | | | |
|---|---|---|---|---|---|---|
| Comp. Ex. 4 | 51.4 | 7.70 | 13.8 | 32.6 | 98 | 94 |

TABLE 2

| | Heat Setting | | | | Heat Shrinkage Ratio | | | |
|---|---|---|---|---|---|---|---|---|
| | First Stage | | Second Stage | | Conditions of Heating | | Shrinkage Ratio | |
| | Temp. (°C.) | Time (sec) | Temp. (°C.) | Time (sec) | Temp. (°C.) | Time (sec) | MD (%) | MD (%) |
| Example 7 | 240 | 20 | 185 | 10 | 230 | 180 | 1.0 | 1.0 |
| Example 8 | 280 | " | 185 | " | " | " | 0.6 | 0.6 |
| Example 9 | 240 | " | 200 | " | " | " | 0.8 | 0.8 |
| Example 10 | 220 | 10 | 190 | 20 | " | " | 1.2 | 1.2 |
| Example 11 | 280 | " | 200 | " | " | " | 0.5 | 0.5 |
| Comp. Ex. 5 | 240 | 20 | 240 | 10 | " | " | 2.2 | 2.2 |
| Comp. Ex. 6 | 240 | " | 165 | " | " | " | 3.2 | 3.2 |
| Comp. Ex. 7 | 180 | " | 200 | " | " | " | 4.5 | 4.5 |

MD: A stretching direction in the first stretching step.
TD: A stretching direction in the second stretching step.

We claim:

1. A method for preparing a biaxially stretched polyether ether ketone film from an amorphous polyether ether ketone film which comprises a first stretching step of roll-stretching said amorphous polyether ether ketone film in a temperature range of from 50° C. to (the glass transition temperature of said film −10)° C. in a stretching ratio of from 150% to 350% in the progress direction of said film while a necking phenomenon is caused in said film; a second stretching step of stretching said film in the temperature range of from the glass transition temperature of said film to 170° C. in a direction at right angles to the stretching direction in said first stretching step in a stretching ratio of from 150% to 350% to form a biaxially stretched film; and a heat setting step of thermally setting said biaxially stretched film in two stages in the temperature range of 210°-330° C. and the temperature range of 180°-210° C.

2. The method for preparing a biaxially stretched polyether ether ketone film according to claim 1 wherein said biaxially stretched polyether ether ketone film has a thickness of 15 μm or less.

3. The method for preparing a biaxially stretched polyether ether ketone film according to claim 1 wherein said biaxially stretched polyether ether ketone film has an insulation disruptive voltage of 350 V/μm or more.

4. The method for preparing a biaxially stretched polyether ether ketone film according to claim 1 wherein each heating time of said two stages in said heat set step is in the range of from 1 to 60 seconds.

5. The method for preparing a biaxially stretched polyether ether ketone film according to claim 1 wherein said polyether ether ketone is a polymeric compound comprising a repeating unit represented by the formula [I]:

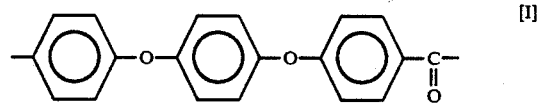

[I]

6. The method for preparing a biaxially stretched polyether ether ketone film according to claim 1 wherein a temperature at the time of said first stretching is in the range of from 50° to 134° C.

7. The method for preparing a biaxially stretched polyether ether ketone film according to claim 1 wherein a temperature at the time of said second stretching is in the range of from 144° to 170° C.

8. The method for preparing a biaxially stretched polyether ether ketone film according to claim 1 wherein said heat setting is carried out under such tension as to bring about a controlled shrinkage of from 0.5 to 20% in the stretching direction in said second stretching step.

UNITED STATES PATENT AND TRADEMARK OFFICE
CERTIFICATE OF CORRECTION

PATENT NO. : 5,242,648
DATED : September 7, 1993
INVENTOR(S) : Matsumura et al

It is certified that error appears in the above-indentified patent and that said Letters Patent is hereby corrected as shown below:

Column 2, line 47, amend "10°C" to --210°C--.

Column 8, Table 1, Example 1, amend "2500" to --250--;
amend "7.70" to --51.4--;
amend "12.1" to --7.70--;
amend "12.0" to --12.1--;
amend "466" to --12.0--;
amend "0" to --466--;
amend " " (blank) to --0--.

Column 10, claim 4, line 23, amend "set" to setting--.

Signed and Sealed this

Twenty-eighth Day of June, 1994

Attest:

BRUCE LEHMAN

*Attesting Officer*     *Commissioner of Patents and Trademarks*